No. 749,531. PATENTED JAN. 12, 1904.
G. F. CONNER.
THRESHING MACHINE.
APPLICATION FILED APR. 15, 1901.
NO MODEL. 2 SHEETS—SHEET 2.
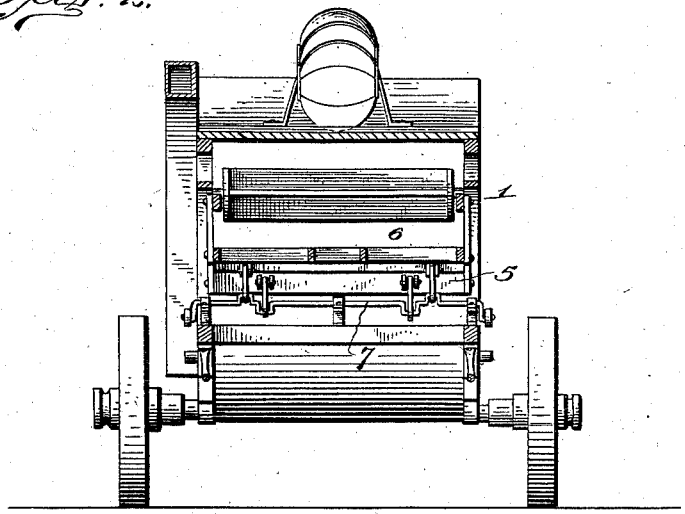
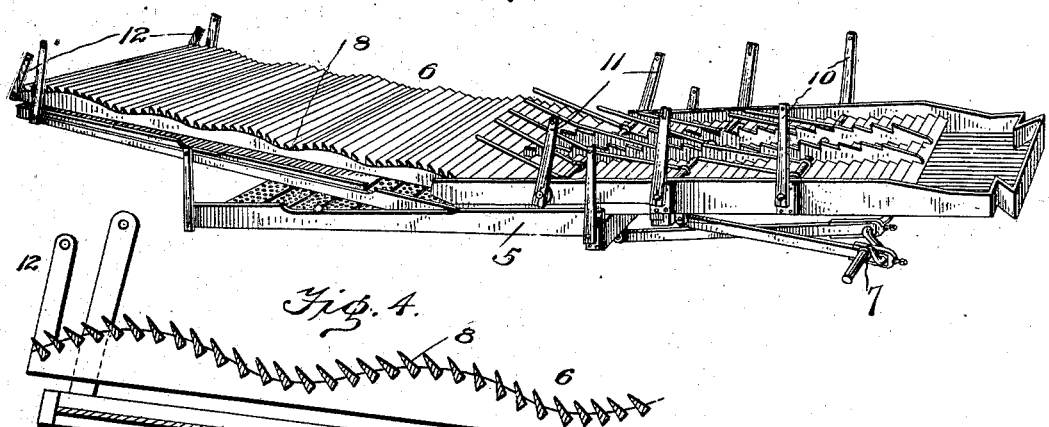
Inventor
George F. Conner
Witnesses
By H. B. Wilson & Co
Attorney No. 749,531. Patented January 12, 1904.

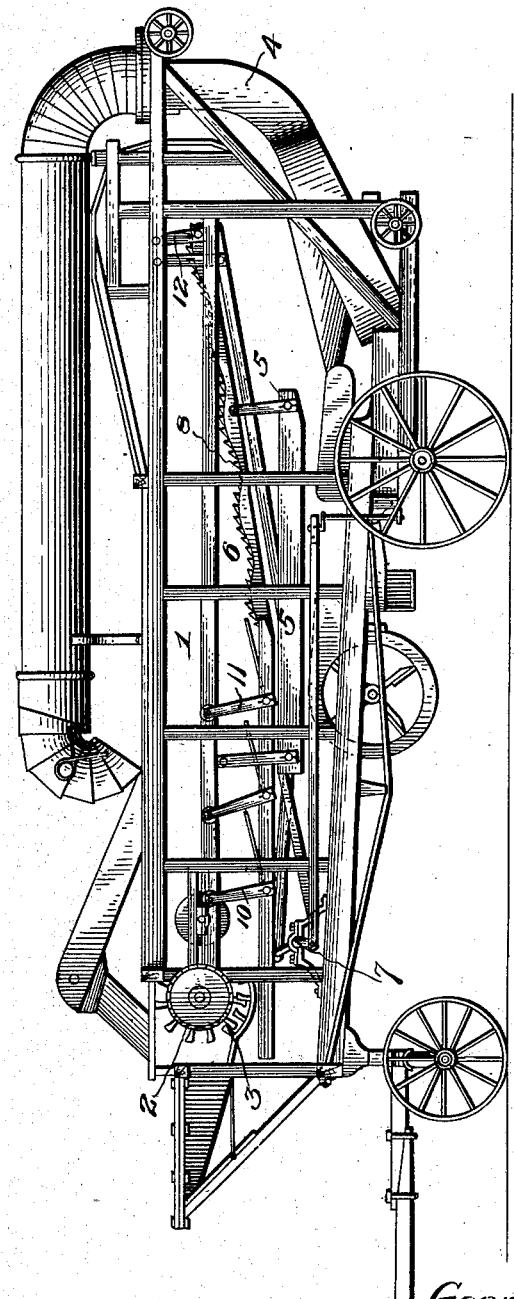

UNITED STATES PATENT OFFICE.

GEORGE F. CONNER, OF PORT HURON, MICHIGAN.

THRESHING-MACHINE.

SPECIFICATION forming part of Letters Patent No. 749,531, dated January 12, 1904.

Application filed April 15, 1901. Serial No. 55,917. (No model.)

*To all whom it may concern:*

Be it known that I, GEORGE F. CONNER, a citizen of the United States, residing at Port Huron, in the county of St. Clair and State of Michigan, have invented certain new and useful Improvements in Threshing-Machines; and I do declare the following to be a full, clear, and exact description of the invention, such as will enable others skilled in the art to which it appertains to make and use the same.

This invention relates to improvements in threshing-machines; and its object is to provide an improved construction of straw-rack and manner of mounting the same whereby a more thorough and effective separation of the grain from the straw is secured.

To this end the invention consists in certain novel features of construction, combination, and arrangement of parts, as will be herein20 after more fully described, and particularly set forth in the appended claim.

In the accompanying drawings, Figure 1 is a side elevation of a threshing-machine embodying my invention, the frame appearing in skeleton form to clearly disclose the interior construction. Fig. 2 is a vertical transverse section of the same on line 2 2 of Fig. 1. Fig. 3 is an enlarged detail perspective view of the straw-rack and cleaning-sieve, and Fig. 4 is a longitudinal section of the rack.

Referring now more particularly to the drawings, the numeral 1 represents the frame or body of the machine, 2 the cylinder, 3 the concave, 4 the wind stacker-chute, and 5 the cleaning-sieve, all of which may be of the ordinary or any approved construction.

The straw-rack 6 is employed to receive the straw from the cylinder 2 and convey it to the wind stacker-chute 4 and also for separating the threshed kernels from the straw as it passes over the surface of the rack. The rack conveys the straw by means of a jumping motion, which is imparted to it by the crank-shaft 7, which is driven by means of suitable gearing or belt-wheel and belt connections from the driving mechanism of the machine. To effect a thorough separation of the grain-kernels from the straw as the latter passes over the rack, I provide the rack with a reg50 ular gradual wavy or fluted surface 8, the undulations of which by forming comparatively long or broad arcuate flutes or curves instead of straight or curved narrow points or angles have the tendency of disturbing the shape of the straw in passing over it in such a manner that the stalks are disturbed and separated, so as to allow the kernels to fall from the stalks through the spaces between the slats and then return to the cleaning-sieve 5. The front portion of the rack is horizontal, or substantially so, and the rear portion thereof is upwardly inclined. The surface of the rack, which in contour is undulating and presents a series of flowing or merging curves, forming ascending series of waves, is composed of angular cross-bars, in the present instance, as shown in the drawings, prismatic bars, having their apices in the line of such curves. These flowing or merging curves are of such length as to space the crests of the waves sufficiently to allow the straw while passing over the rack to bend above and below its plane of movement as it passes over each successive wave and to conform to the shape and curvature of the successive undulations or waves, so that the straw is engaged by the bars of the rack at practically all points from end to end of the straw. The advantage of employing this wavy, undulating, or fluted surface instead of a straight or stepped rectangular one or a pointed wavy one is that the straw passes along the undulations much more readily than along an angular or pointed surface and separation is much more thorough, for the reason that the straw is acted on by the rack more uniformly along its entire under surface, whereas with the pointed or stepped corrugations the rack acts upon the straw at one point only. Furthermore, the straw, instead of being retarded or caused to hang in bunches, as in racks having steps, points, or irregular surfaces, is allowed to thin or spread out, so as to more effectually release the grain-kernels and permit them to drop down onto the cleaning-sieve below. This is a desirable and important feature of my construction.

Another distinctive feature of my invention resides in the fact that in the construction of the rack the steepest incline does not exceed that of a line at right angles to the hangers which support it. By this construction when the rack is receding upon the forward passage of the straw a rasping or rubbing action of the rack against the bottom of the straw is exerted and greatly aids in the release of the kernels by the movement of the parts of the straw one upon the other. This action is more effective with an undulating than an angular stepped surface, for the reason that the rasping or stirring motion is more uniform under the whole column of straw, whereas in a pointed or stepped rack this agitation is not as marked and occurs only on a small proportion of the column of the straw.

The rack is mounted in a novel manner, so as to have a peculiar throw or motion to effect the thinning or spreading out of the straw over the upper portion thereof to secure the effective separation of the grain therefrom. To this end it is supported from the frame by hangers 10, 11, and 12. The hangers 10 are made longer than the hangers 11, and said hangers 11 are longer than the hangers 12. By this construction and manner of mounting the rack it will be seen that when the cranks of the shaft 7 throw the rack in a rearward direction the rack takes a backward and upward motion in a circular path, the radius of which is the length of the hangers 10, 11, and 12. The lateral motion of all parts of the rack is equal, and on account of the rear hangers 12 being shorter the rear end of the rack will have a much stronger uplift than the front end and for this reason has a tendency to work the straw along much faster at the rear end, where the motion has a greater uplift, than at the front end, and it will thus be seen that the nearer the straw approaches the rear end of the rack the faster it will travel, and the rack will thus tend to pull the straw out into a thin sheet as it passes toward the rear of the wavy surface 8. By this means the straw will be thinned and spread out over the upper surface of the rack and the grain and straw thrown or tossed higher and farther to the rear, whereby the particles of the straw will be pulled apart, releasing the grain-kernels and allowing them to fall out from among the straw and to drop down onto the cleaning-sieve 5, whereby the efficiency of the rack as a separator is greatly increased.

From the foregoing description, taken in connection with the accompanying drawings, the operation of the apparatus will be readily understood, and it will be seen that the peculiar motion of the rack acts in concert with the wavy, corrugated, or slatted surface thereof to effect a much more thorough separation of the grain from the straw than is attainable in straw-racks of ordinary construction.

Variations in the form and arrangement of parts may be made within the scope of the invention without departing from the spirit or sacrificing any of the advantages thereof.

Having thus fully described my invention, what I claim as new, and desire to secure by Letters Patent, is—

A substantially horizontal reciprocating straw-rack, provided upon its upper or working face with longitudinal serrated or ratcheted straw-conducting bars, and with vibrating lifting-fingers; said straw-rack being formed with an upwardly-inclined portion in rear of said bars and fingers; said upward incline composed of transverse bars angular in cross-section and having their apices lying in a curved undulating line or surface in the direction of feed of the material.

In testimony whereof I have hereunto set my hand in presence of two subscribing witnesses.

GEORGE F. CONNER.

Witnesses:
 G. R. HAIGH,
 H. B. HOYT.